United States Patent [19]

Benjamin et al.

[11] Patent Number: 5,668,654

[45] Date of Patent: Sep. 16, 1997

[54] PACKAGE FOR AN INFRARED COMMUNICATIONS ADAPTER

[75] Inventors: Karen Elizabeth Benjamin; Jeffrey Byron McClinton; Robert Neil Whiteman, Jr.; Earl Chester Myers, Jr.; John Joseph Consoli, all of Harrisburg, Pa.

[73] Assignee: The Whitaker Corporation, Wilmington, Del.

[21] Appl. No.: 453,729

[22] Filed: May 30, 1995

[51] Int. Cl.$^6$ ................................................ H04B 10/00
[52] U.S. Cl. ........................................ 359/152; 361/752
[58] Field of Search ........................ 359/152, 159, 359/162, 163; 385/88, 90, 92, 93; 361/752, 756, 785, 796, 802; 345/156, 163, 169, 905; 463/36, 37, 38, 39; 273/148 H

[56] References Cited

U.S. PATENT DOCUMENTS

| | | | |
|---|---|---|---|
| 4,069,403 | 1/1978 | Beaudette et al. | 200/51.12 |
| 4,404,522 | 9/1983 | Pucciarello | 324/114 |
| 4,431,966 | 2/1984 | Pucciarello | 324/114 |
| 4,789,224 | 12/1988 | Bougsty | 350/345 |
| 4,809,257 | 2/1989 | Gantenbein et al. | 370/4 |
| 4,978,317 | 12/1990 | Pocrass | 439/490 |
| 5,109,453 | 4/1992 | Edwards et al. | 385/90 |
| 5,109,454 | 4/1992 | Okuno te al. | 385/92 |
| 5,142,538 | 8/1992 | Fickes et al. | 371/34 |
| 5,146,620 | 9/1992 | Swikle et al. | 455/351 |
| 5,181,181 | 1/1993 | Glynn | 345/163 |
| 5,191,461 | 3/1993 | Cranshaw et al. | 359/154 |
| 5,276,279 | 1/1994 | Brownlie et al. | 174/65 R |
| 5,289,345 | 2/1994 | Corradetti et al. | 361/752 |
| 5,327,328 | 7/1994 | Simms et al. | 362/26 |
| 5,329,428 | 7/1994 | Block et al. | 361/785 |
| 5,339,178 | 8/1994 | Phelps, III et al. | 359/42 |
| 5,349,504 | 9/1994 | Simms et al. | 362/32 |
| 5,359,492 | 10/1994 | Porter | 361/683 |
| 5,373,149 | 12/1994 | Rasmussen | 235/492 |
| 5,416,872 | 5/1995 | Sizer, II et al. | 385/88 |
| 5,466,174 | 11/1995 | Savage et al. | 439/596 |
| 5,470,252 | 11/1995 | Fladung | 439/490 |
| 5,506,921 | 4/1996 | Horie | 385/88 |
| 5,555,161 | 9/1996 | Roe et al. | 362/32 |
| 5,567,175 | 10/1996 | Warden et al. | 439/490 |

OTHER PUBLICATIONS

Photolink: Newest addition to wireless LAN arena, computer reseller news, Jul. 31, 1989.
Gimmick or Breakthrough, Wireless and rechargeable mouse Apr. 2, 1992 DAK industries.

*Primary Examiner*—Wellington Chin
*Assistant Examiner*—Rafael Bacares
*Attorney, Agent, or Firm*—Anton P. Ness

[57] ABSTRACT

An infrared communications adapter (10) is provided having a two part housing (22, 24) that snaps together to form a housing assembly (12) having an interior cavity (30). The interior cavity contains a circuit board (32) having communications circuitry and components thereon, including light emitting diodes (42, 44, 46) for indicating operating status of the unit and a photodiode array (34) for receiving and transmitting infrared signals. The adapter (10) includes a light pipe (50) having three light conducting channels (204, 206, 208) that conduct light from the three light emitting diodes (42, 44, 46) to viewing facets (190, 192, 194) on the light pipe that extend through openings in the housing (12). A lens (20) is arranged in a front end of the housing directly in front of the photodiode array (34). An articulated coupling 60 removably couples a stand (14) to the housing assembly (12) and permits aiming of the unit for receiving and transmitting the infrared signals. A cable (16) is terminated at one end to the circuitry on the circuit board (32) and at the other end to a connector (18) that is connected to an input/output data port of a computer or other equipment.

33 Claims, 10 Drawing Sheets

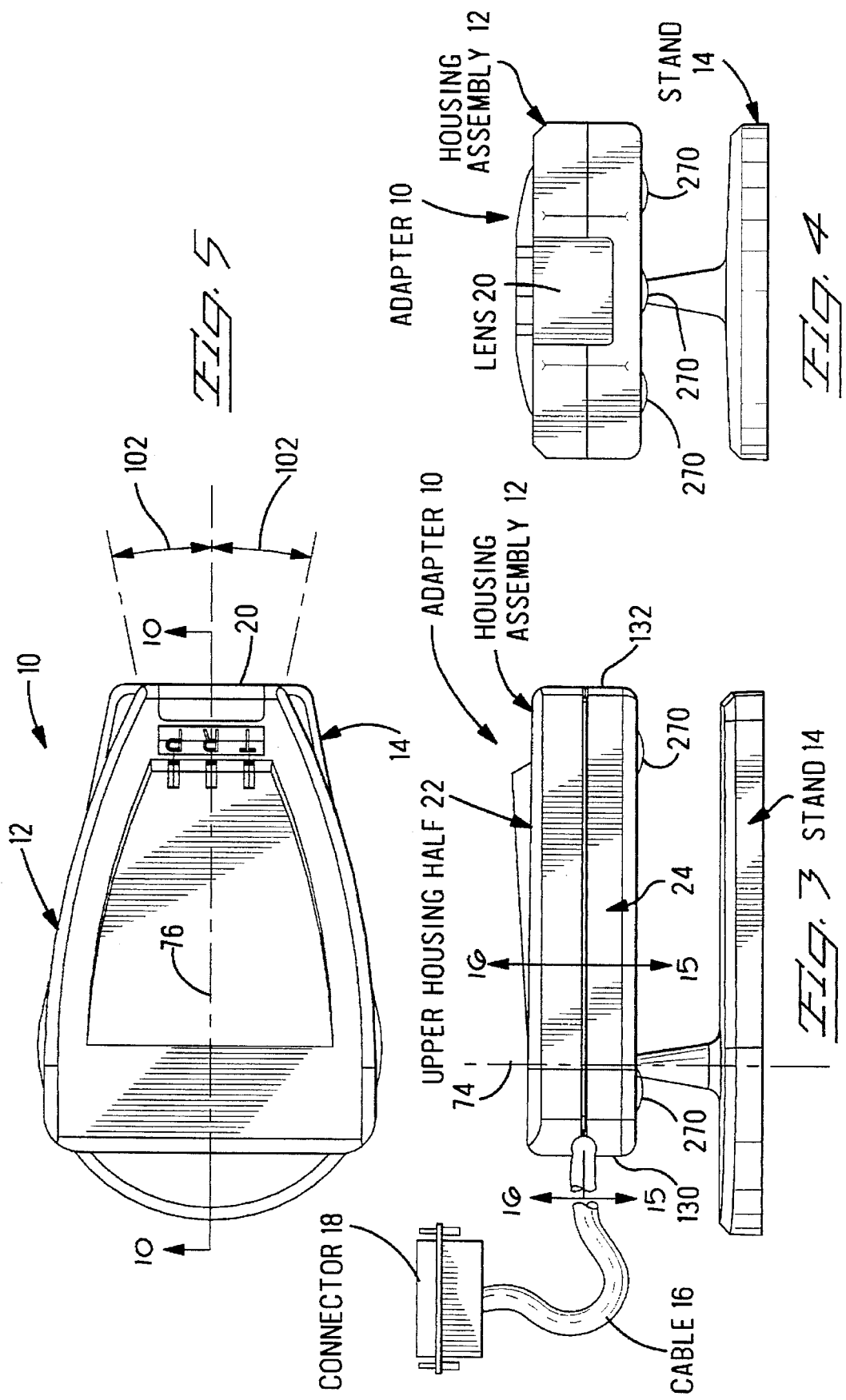

5,668,654

1

PACKAGE FOR AN INFRARED COMMUNICATIONS ADAPTER

The present invention is related to infrared communications equipment and more particularly to a package for an infrared communications adapter for interconnecting to a data port.

BACKGROUND OF THE INVENTION

In the computer and computer peripherals industry, computers are sometimes interconnected to other computers, peripheral devices, and other equipment through a wireless infrared link instead of the conventional hard wire cable link. For example, keyboards, printers, and even computers may be easily and interchangeably interconnected to computers and other devices via these wireless infrared links. Further, a few lap top computers and other equipment are being manufactured with such infrared links built in so that they can be interfaced with other equipment having an infrared port. Whether the infrared link is external or built in, the interface is accomplished by simply placing the two devices in proximity and visual alignment within limits specified by standards governing the infrared communications protocol. A typical communications protocol currently being used in the industry, for example, is the Infrared Data Association (IRDA) standard commonly referred to as IrDA 1. In the cases where the infrared ports are not built into the original equipment, external infrared communications adapters are used. The external infrared communications adapter includes a package housing the infrared circuitry and components, and a cable terminated with a connector that is connected to a data port on the equipment. The data port may be a standard serial or parallel port. Each unit of equipment is equipped with such an infrared communications adapter. When it is desired to interconnect one unit to another unit, the two infrared communications adapters are pointed, or aimed, at each other within the limits of the protocol and the interconnection is complete. This aiming of the infrared communications adapters, however, requires that the adapter package be easily positioned and then held in that position during the period of interconnection. Currently available infrared communications adapters are not easily manipulated to achieve this. Additionally, these adapters are costly to manufacture because they typically are complex structures held together by means of separate fastener devices.

What is needed is an external infrared communications adapter that is easily aimed and held in place during use. Additionally, the package housing the adapter should be constructed of a minimum of separate parts that do not require external fasteners to join them together, thereby lowering the cost of manufacturing the package.

SUMMARY OF THE INVENTION

A package is disclosed for an infrared communications adapter. The communications adapter includes a circuit board having a communications circuit thereon and an infrared transceiver. The circuit is arranged to interface with a data port by means of an electrical cable terminated with a connector. The package includes an upper housing half and a lower housing half, each of which have first features that are integral to their respective housing halves and cooperate, and are the sole means, to position and interlock the housing halves together. The two housing halves form a housing assembly having an interior cavity for holding the circuit board therein. A longitudinal axis extends through the interior cavity and through the infrared transceiver near a first

2 end of the cavity. The first features include at least one projection extending from one of the upper and lower housing halves and at least one opening in the other of the upper and lower housing halves in alignment with the projection. The opening is arranged to interferingly receive the projection therein thereby effecting the position and the interlock of the housing halves together.

DESCRIPTION OF THE FIGURES

FIGS. 3, 4, and 5 are side, front, and plan views, respectively, of the adapter shown in FIG. 1;

FIGS. 15 and 16 are cross-sectional views taken along lines 15—15 and 16—16 respectively, in FIG. 3;

DESCRIPTION OF THE PREFERRED EMBODIMENT

Figure 6:
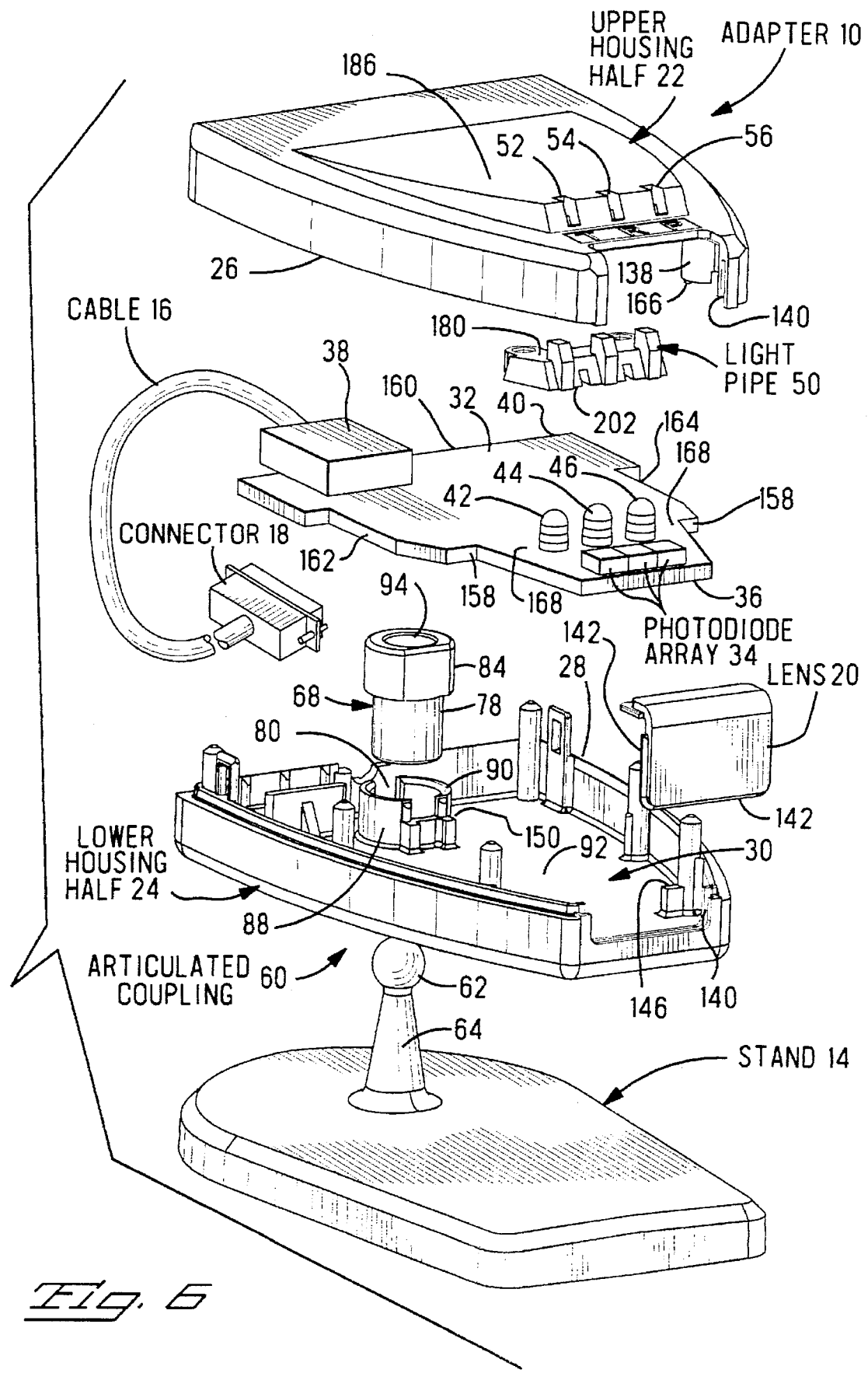
FIGS. 6 and 7 are exploded parts views of the adapter shown in FIG. 1 taken from different directions.
Figure 7:
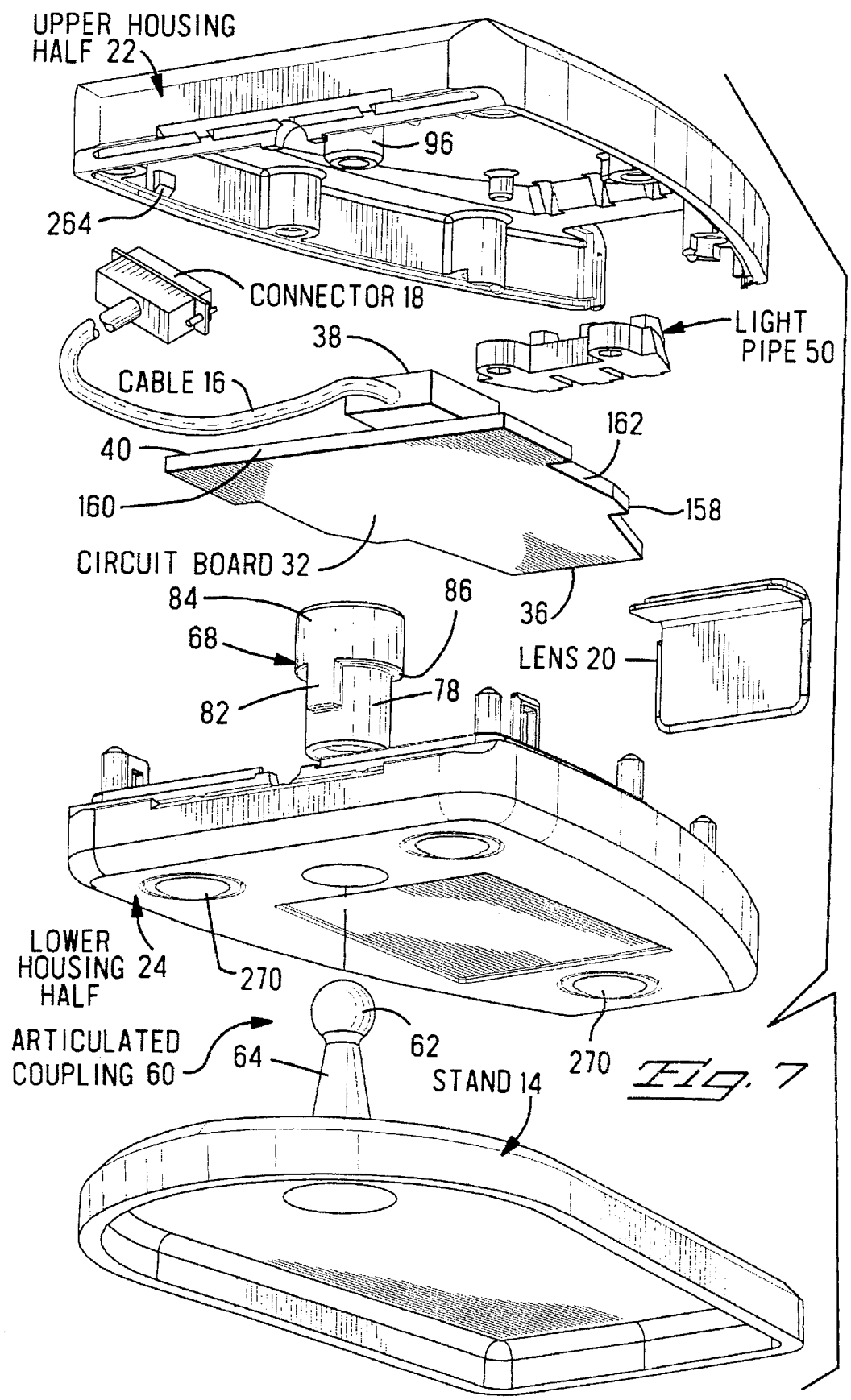

There is shown in FIGS. 1 through 5 an infrared communications adapter 10 having a housing assembly 12, a stand 14, and an electrical cable 16 with a connector 18 terminated to its free end. The connector 18 is of the type to mate with a standard port on a computer, peripheral device, or other equipment, such as a serial port or parallel port commonly used in the industry. The adapter 10 includes a lens 20 arranged in a front end of the housing assembly 12 which receives infrared light signals during operation of the adapter, as will be explained below. As best seen in FIGS. 6 and 7, the housing assembly 12 of the adapter 10 is composed of an upper housing half 22 and a lower housing half 24 that are mated along common peripheral edges 26 and 28, respectively, to form an interior cavity 30.

A circuit board 32 having infrared communications circuitry thereon is disposed within the internal cavity 30, and includes a photodiode array 34 near a front end 36, all thereby defining an infrared transceiver. The cable is terminated to a connector 38 which is mounted to a rear end 40 of the circuit board 32 and interconnected to the communications circuitry contained thereon in the usual manner. In addition to the various components that are mounted to the circuit board that are not shown, there are three light emitting diodes 42, 44, and 46 interconnected to the communications circuitry that indicate the current operational status of the adapter 10, as will be describe below. Additionally, a light pipe 50, which will be described in more detail below, is positioned within the interior cavity 30 so that it will transmit light emitted by the diodes 42, 44, and 46 to respective openings 52, 54, and 56 formed in the upper housing half 22, as shown in FIGS. 6 and 7.

Figure 8:
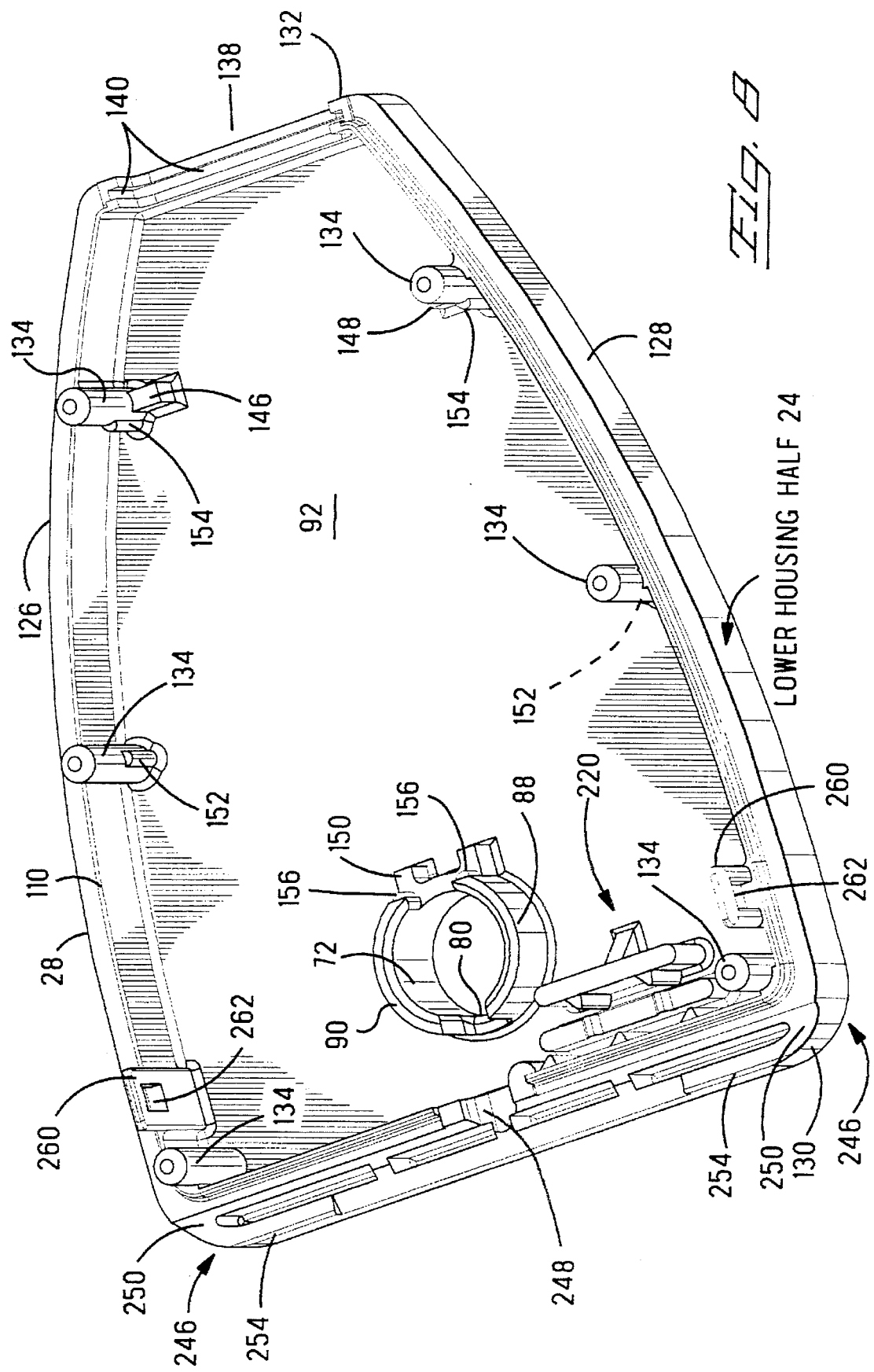
FIG. 8 is an isometric view of the lower housing half of the adapter.
Figure 10:
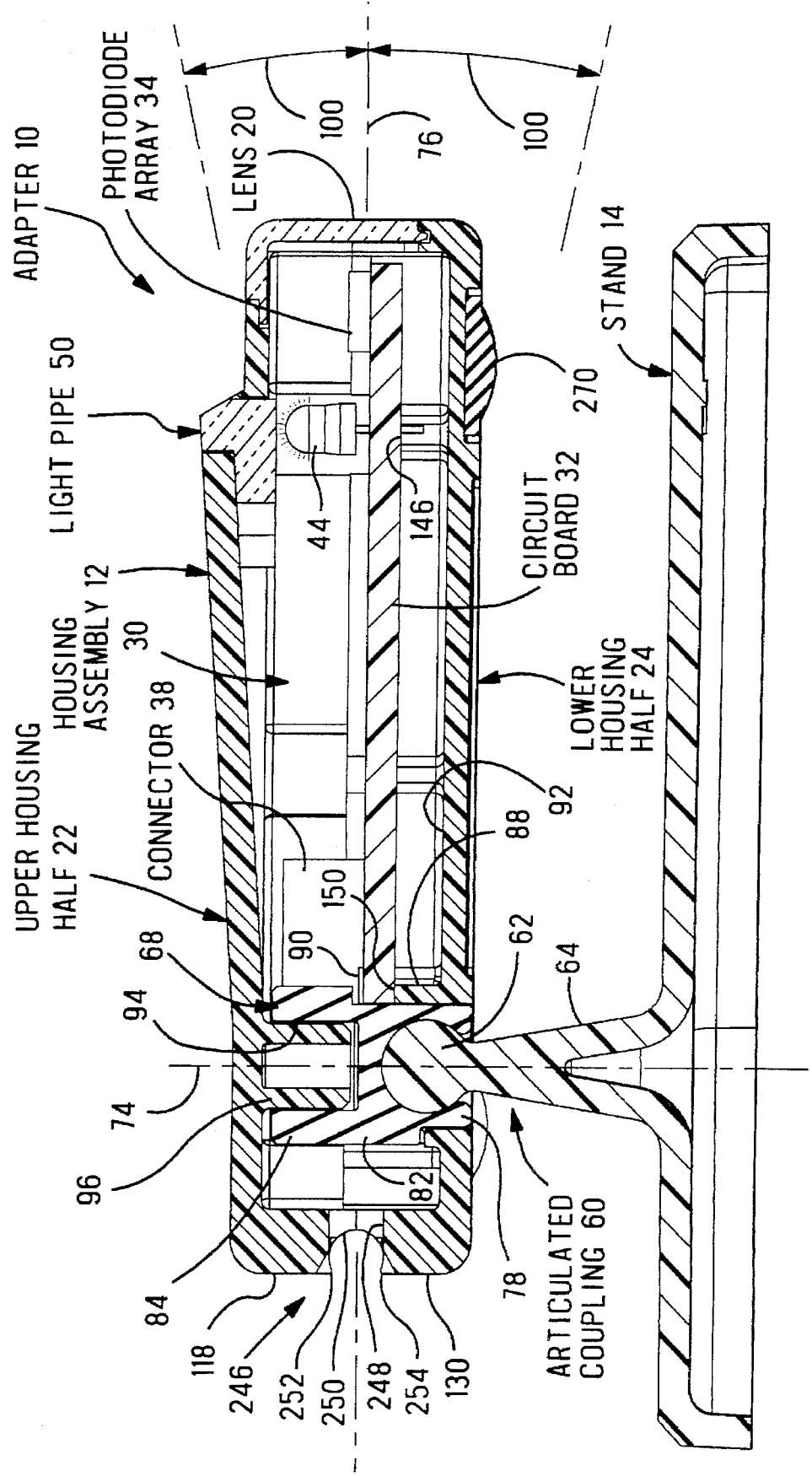
FIG. 10 is a cross-sectional view taken along the lines 10—10 in FIG. 5.
Figure 11:
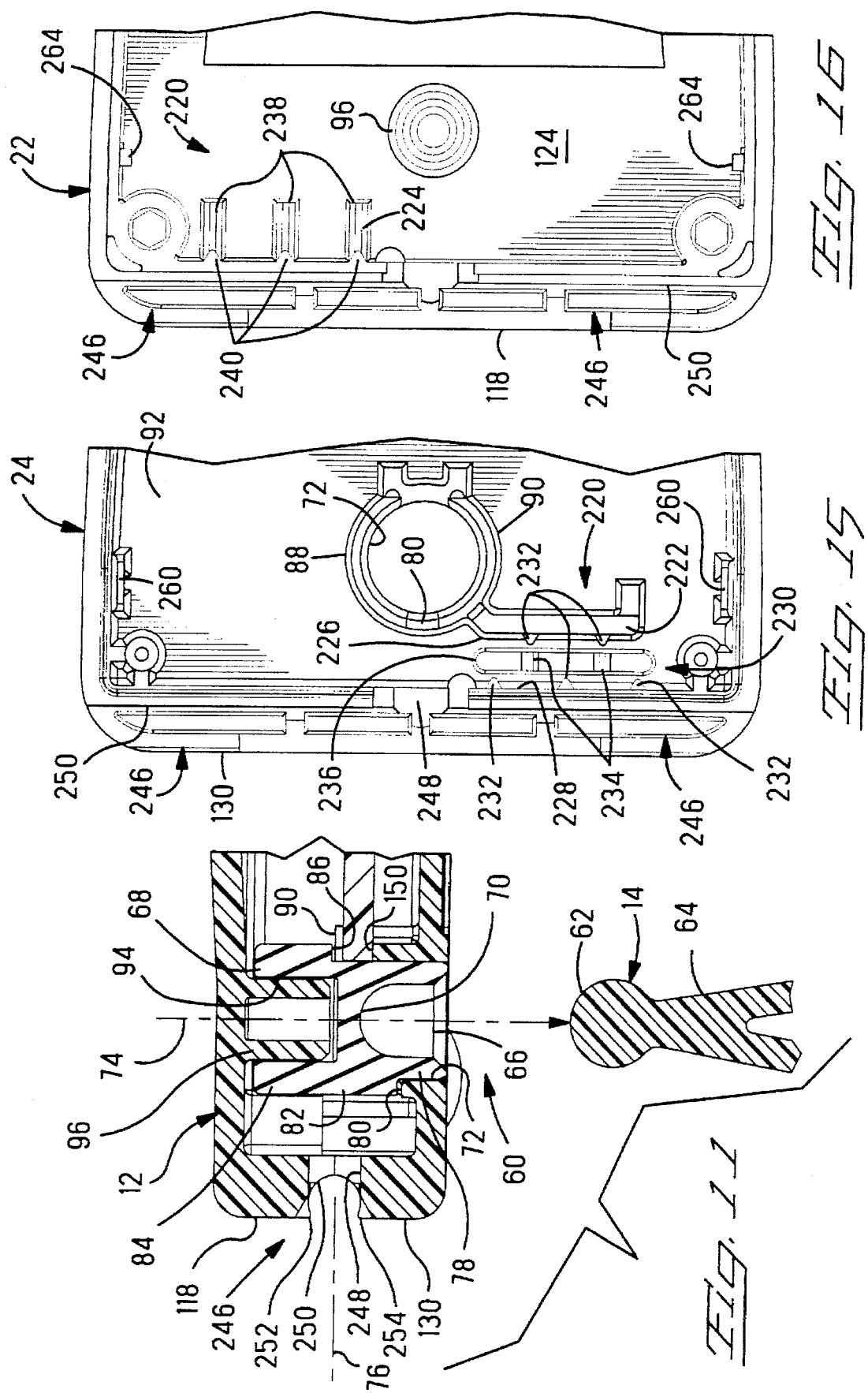
FIG. 11 is a view of a portion of the view of FIG. 10 showing the stand and adapter unit separated.
Figure 12:
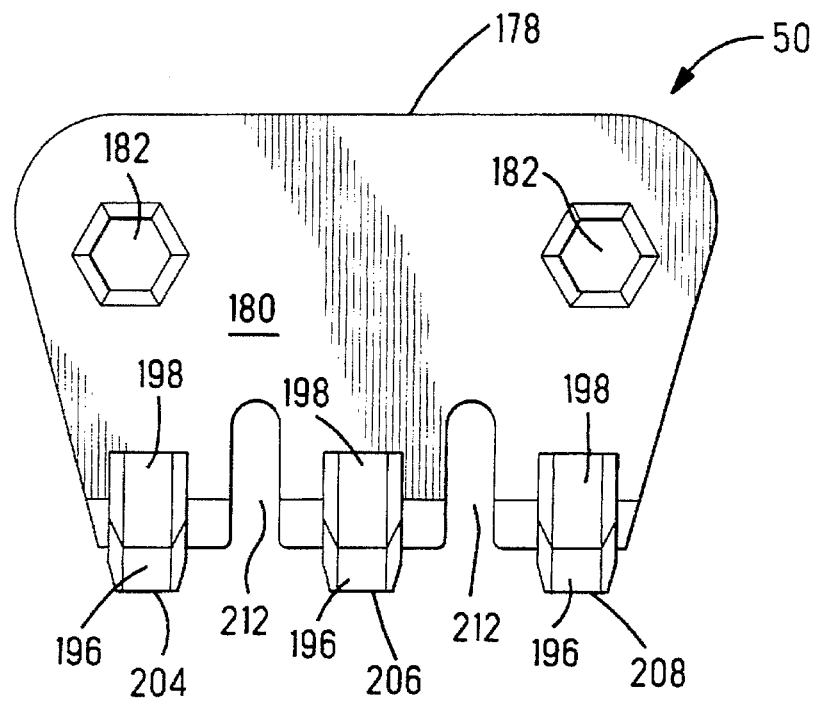
FIGS. 12, 13, and 14 are top, front, and side views, respectively, of a light pipe shown in FIGS. 6 and 7.

As best seen in FIGS. 6, 7, 10, and 11, the stand 14 is removably attached to the housing assembly 12 by means of an articulated coupling 60. The articulated coupling includes a ball portion 62 that extends above and is attached to the stand 14 by means of a tapered pedestal 64. The ball portion 62 seats in an internal cylindrically shaped cavity 66 formed in a thermoplastic elastomer grommet 68. The cavity 66 terminates in a somewhat hemispherically shaped end wall 70 that engages the top of the ball portion 62, as shown in FIG. 10. A cylindrical opening 72 is formed in the lower housing half 24 having an axis 74 that is perpendicular to a longitudinal axis 76 of the housing assembly 12, as shown in FIGS. 3, 5, and 10. The grommet 68 has an outer diameter 78 that is a line fit with the cylindrical opening 72. The cavity 66 has an inner diameter that is substantially concentric to the outer diameter 78. The ball portion 62 has a diameter that is larger than the interior diameter of the cavity 66 so that the walls of the cavity and the end wall 70 are conformably deformed by the ball a sufficient amount so that the friction therebetween will provide a desired amount of static resistance to relative tilting movement of the housing assembly 12 with respect to the stand 14. The static resistance to tilting provided by the cooperation of the ball portion 62 with the walls of the cavity 66 and the end wall 70 should be from about 0.01 inch pounds to about 0.03 inch pounds, and preferably, should be about 0.02 inch pounds for optimum controlled movement when aiming the communications adapter 10. The cylindrical opening 72 includes a key slot 80 in the lower housing 24, as best seen in FIGS. 6, 8, and 12, and the grommet 68 includes a key 82, or projection, as best seen in FIGS. 7 and 10, extending into the key slot to secure the grommet against rotation with respect to the lower housing. This assures that only the friction between the ball portion 62 and the walls of the cavity 66 and the end wall 70 will govern the static resistance to tilting. The grommet 68 includes an enlarged portion 84, as best seen in FIGS. 6, 7, and 10, that is larger than the diameter 78, thereby forming a shoulder 86. The cylindrical opening 72 is formed in a boss 88 extending from the floor 92 of the lower housing half 24, leaving a raised surface 90, against which the shoulder 86 of the grommet 68 rests. The enlarged portion 84 of the grommet includes a hole 94, as best seen in FIG. 6, into which extends a projection 96, as shown in FIGS. 10 and 11. This enlarged portion holds the grommet 68 captive within the housing assembly 12 during removal of the stand. The projection 96 extending into the hole 94 prevents the relatively soft material from collapsing and allowing the enlarged portion 84 to pass through the cylindrical opening 72. The ball portion 62 and the grommet 68 are arranged so that the longitudinal axis 76 of the adapter 10 can be tilted in the vertical direction a minimum of plus or minus 30 degrees, as indicated at 100 in FIG. 10 and, additionally, can be tilted in the horizontal direction a minimum of plus or minus 30 degrees, as indicated at 102 in FIG. 5. The cooperative friction between the ball portion 62 and the grommet 68 permits easy and smooth tilting movement of the housing assembly 12 with respect to the stand 14, yet will securely hold the housing in position after it is aimed as desired. In the present example the grommet 68 is made from a thermoplastic elastomer sold under the tradename of SARLINK 1360, and manufactured by DSM Thermoplastic Elastomers Inc. of 690 Mechanic Street, Leominster, Mass. 01453. The SARLINK 1360 material has a hardness of 64 Durometers on the Shore A scale. In this example the diameter 78 of the grommet 68 is 8.25 mm, the diameter of the cylindrical cavity 66 is 5.25 mm, and the ball portion 62 has a diameter of 5.75 mm. It will be understood that the grommet 68 may be made from other suitable materials of suitable dimensions to produce the desired static resistance to tilting.

Figure 1:
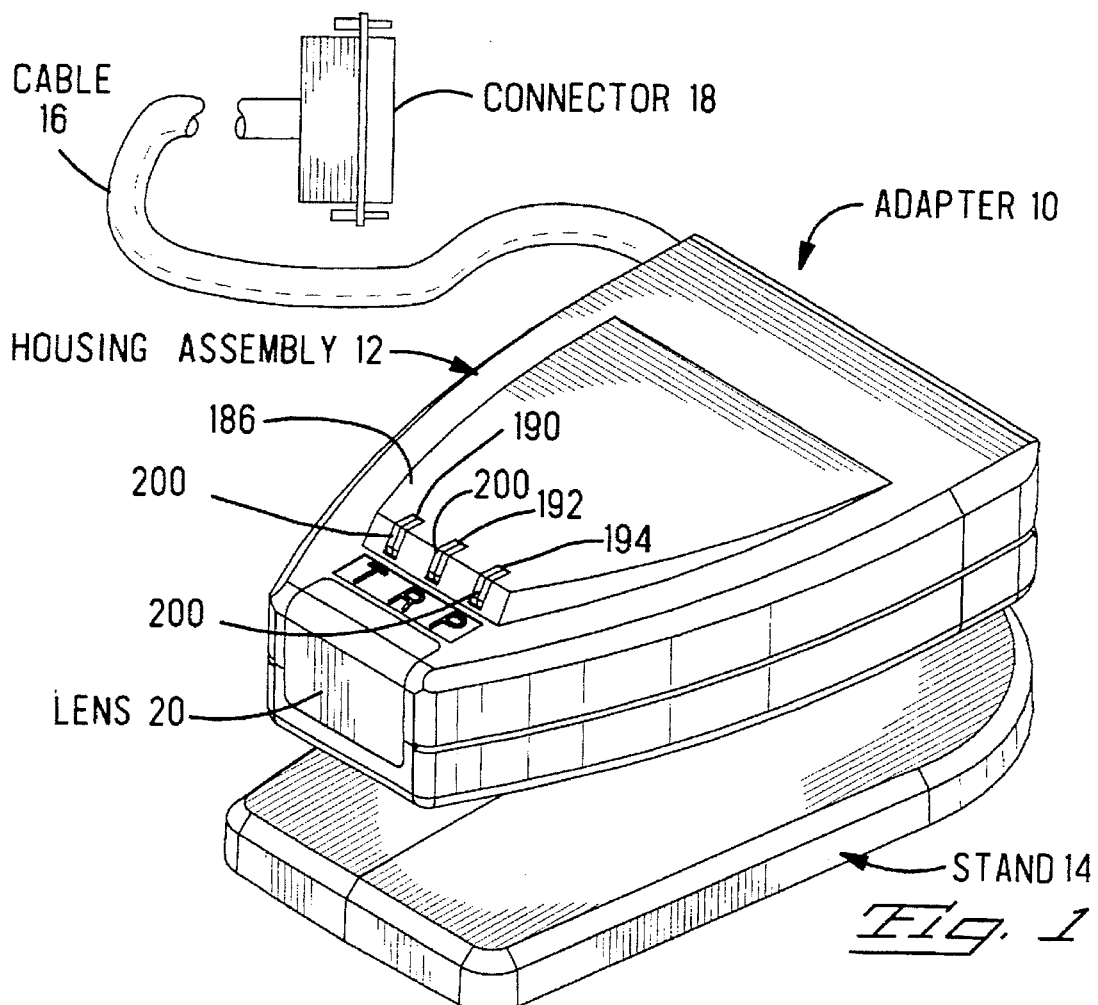
FIG. 1 is an isometric view of an external infrared communications adapter incorporating the teaching of the present invention.
Figure 2:
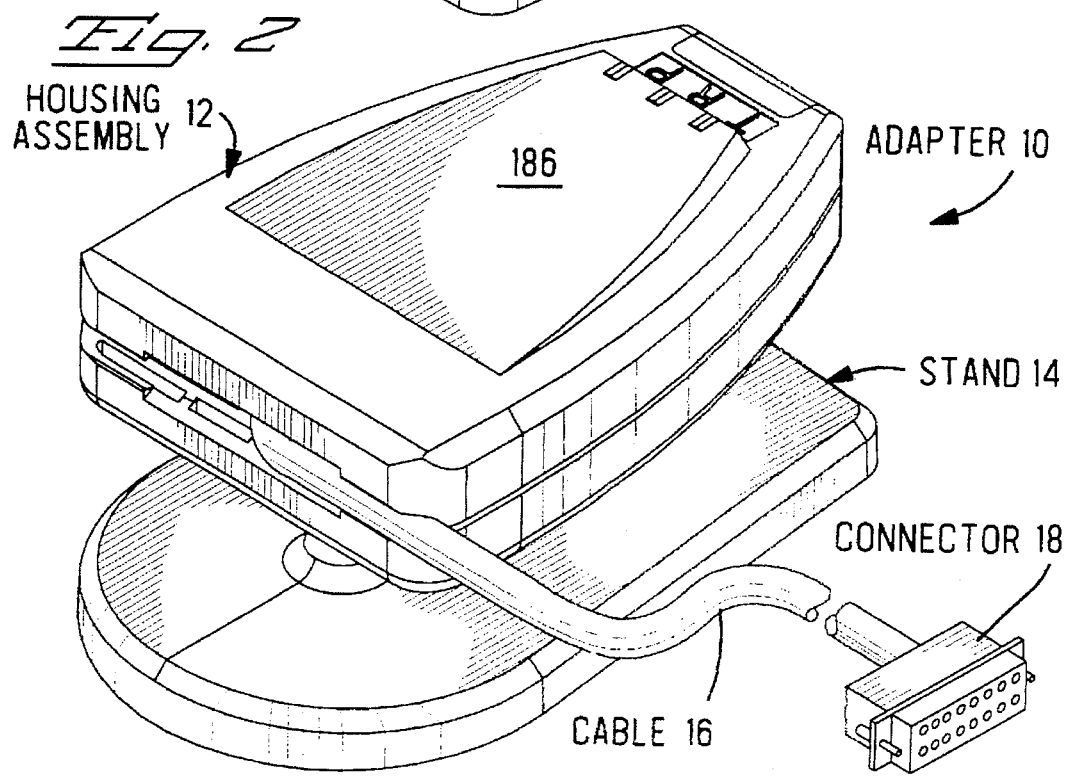
FIG. 2 is an isometric view of the adapter shown in FIG. 1, taken from a different direction.
Figure 9:
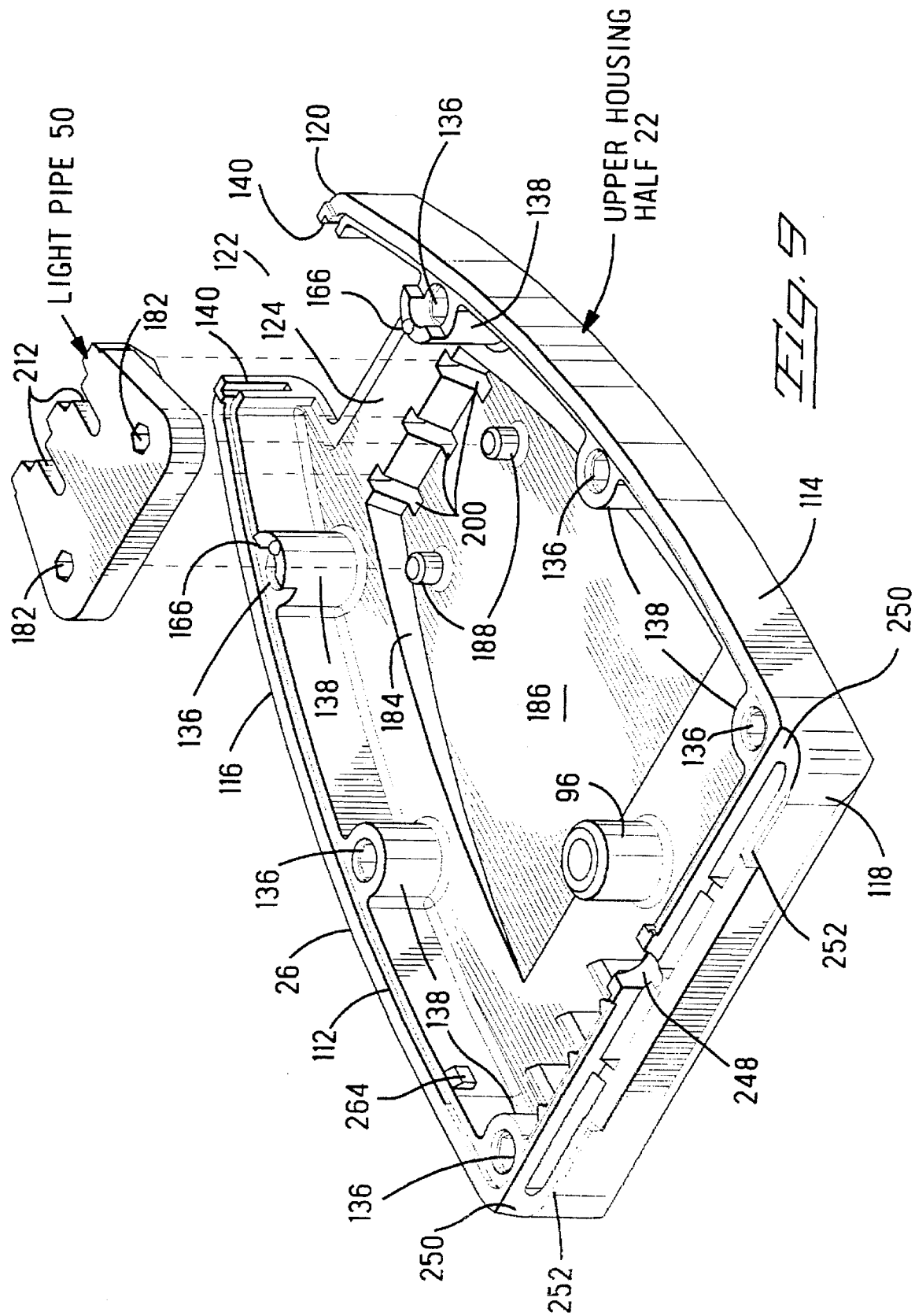
FIG. 9 is an isometric view of the upper housing half of the adapter.

As shown in FIG. 8, the lower housing half 24 includes a lip 110 along most of its peripheral edge 28 that overlaps and locates within a recess 112 that extends along most of the peripheral edge 26 of the upper housing half 22, as shown in FIG. 9, when the two housing halves are in mated engagement, as shown in FIGS. 3 and 4. The upper housing half 22 includes two opposite side walls 114 and 116 that extend from a rear wall 118, and curve forward to a front wall 120. An opening 122 is formed in the front wall 120 that wraps around into the ceiling 124 of the upper housing half 22, for a purpose that will be explained. As shown in FIG. 8, the lower housing half 24 includes two side walls 126 and 128 that extend from a rear wall 130, and curve forward to a front wall 132. When the two housing halves 22 and 24 are in mated engagement, the respective side walls and rear and front walls are in flush alignment. The two housing halves 22 and 24 are held together by means of six posts 134 that project from the floor 92 of the lower housing half 24 and six hexagonal holes 136 formed in bosses 138 in the upper housing half 22, each post 134 being in alignment with a respective hexagonal hole 136. The diameter of each of the posts is chosen to be an interference fit with its respective hexagonal hole so that when the two housing halves are pressed together into mated engagement, the posts and their respective hexagonal holes mutually deform and form tight joints that secure the two housing halves together. The opening 122 in the upper housing half 22 joins with an opening 138 in the front wall 132 of the lower housing half 24 to receive the lens 20, as shown in FIG. 1. The openings 122 and 138 include a groove 140 that receives a flange 142 on the lens 20 that holds the lens captive within the openings 122 and 138 of the housing assembly 12.

As shown in FIGS. 6, 8 and 10, the two housing halves 22 and 24 form an interior cavity 30 that houses the circuit board 32. The circuit board is positioned on three flat surfaces 146, 148, and 150 that extend above the floor 92 a short distance and form a flat mounting plane for the board. Note that the surface 150 is U-shaped and attached to the boss 88. The circuit board 32 is held laterally by means of six projections that are shaped as half cylinders. Two of the projections 152 are formed on the opposing sides of the two center posts 134, as shown in FIG. 8. Two more of the projections 154 are formed on the rear facing sides of the two forward posts 134. And the last two projections 156 are formed on the forward facing side of the boss 88 adjacent the U-shaped flat surface 150. The projections 152, 154, and 156 extend vertically above the mounting surfaces 146, 148, and 150 by more than the thickness of the circuit board 32. As best seen in FIGS. 6, 8, and 10, the circuit board 32 is disposed in the space between the projections 152, 154, and 156. The circuit board has two forwardly facing edges 158 on each side thereof, as shown in FIG. 6, that engage the two forward projections 154, and a rear edge 160 that engages the two projections 156, the circuit board being sized to provide an interference fit between the two sets of projections so that the board is firmly secured therebetween. Additionally, the circuit board 32 includes two side edges 162 and 164 on opposite sides thereof that interferingly engage the two projections 152, to position the board laterally, and to help secure the board to the lower housing half 24. The two forward bosses 138 of the upper housing half 22, as best seen in FIG. 9, each includes a bubble projection 166 that engages either side of the upper forward surface 168 of the circuit board 32 to assure that the photodiode array 34 is maintained in proper alignment.

Figure 13:
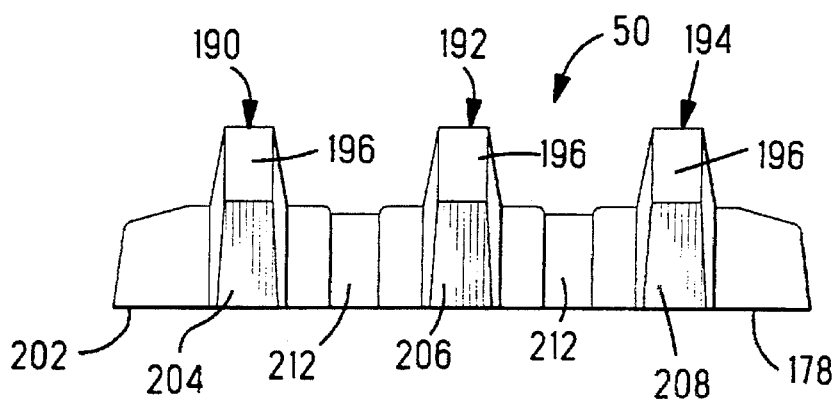
Figure 14:
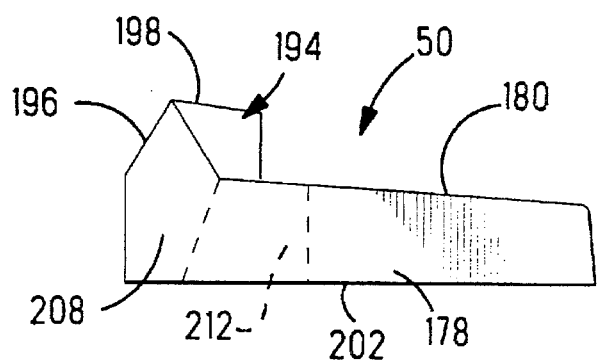

As shown in FIGS. 12, 13 and 14, the light pipe 50 is of unitary construction and includes a main body 178 and a flat mounting surface 180. Two hexagonal holes 182 are formed through the body perpendicular to the mounting surface 180. The upper housing half 22 includes a recess 184 in the ceiling 124, as shown in FIG. 9, thereby forming a raised portion 186, as shown in FIGS. 6 and 9. Two posts 188 extend from the inside of the raised portion 186, in alignment with the two hexagonal holes 182. The diameter of each of the posts 188 is chosen to be an interference fit with its respective hexagonal hole 182. The light pipe is assembled to the upper housing half by pressing the light pipe into mated engagement therewith so that the posts enter their respective hexagonal holes and mutually deform and form tight joints that secure the light pipe to the upper housing half. As shown in FIGS. 9, 12, 13 and 14, the light pipe includes three viewing facets 190, 192, and 194, each of which has two viewing faces, a forward face 196 and an upward face 198, both of which are frosted. The three viewing facets 190, 192, and 194 extend above the mounting surface 180 and project into similarly shaped openings 200 formed in the ceiling 124 and raised portion 186, as best seen in FIGS. 1 and 9. The light pipe 50 includes a light receiving clear surface 202 opposite the mounting surface 180, as shown in FIGS. 6 and 14. Three light conducting channels 204, 206, and 208 extend from the light receiving surface 202 to their respective viewing facets 190, 192, and 194, as shown in FIGS. 12 and 13. A groove 212 is formed in the body 178 between adjacent facets 190, 192 and 192, 194, as shown in FIGS. 12 and 13. The grooves 212 optically separate the three light conducting channels 204, 206, and 208 so that light transfer therebetween is negligible. Referring to FIG. 6, when the circuit board 32 is in position within the lower housing half 24, the light pipe 50 in position within the upper housing half 22, and the two housing halves assembled together, the three light emitting diodes 42, 44, and 46 are closely adjacent the light receiving surface 202 in alignment with the light conducting channels 204, 206, and 208, respectively. Therefore, light from each of these diodes is conducted up to the forward and upward faces 196 and 198 of each respective light conducting channel, and can be viewed there. Light cross talk between the channels is minimized by the grooves 212. As stated above, the lights from these three light emitting diodes indicate operational status of the communications adapter 10. In the present example, the light from the diode 42 is yellow and indicates that the unit is transmitting. The light from the diode 44 is green and indicates that the unit is receiving, while the light from the diode 46 is red and indicates that the unit is receiving power. These colors are by way of example only. It will be understood that any desirable color combination may be utilized to provide an indication of any desired operational state of the adapter 10.

Figure 17:
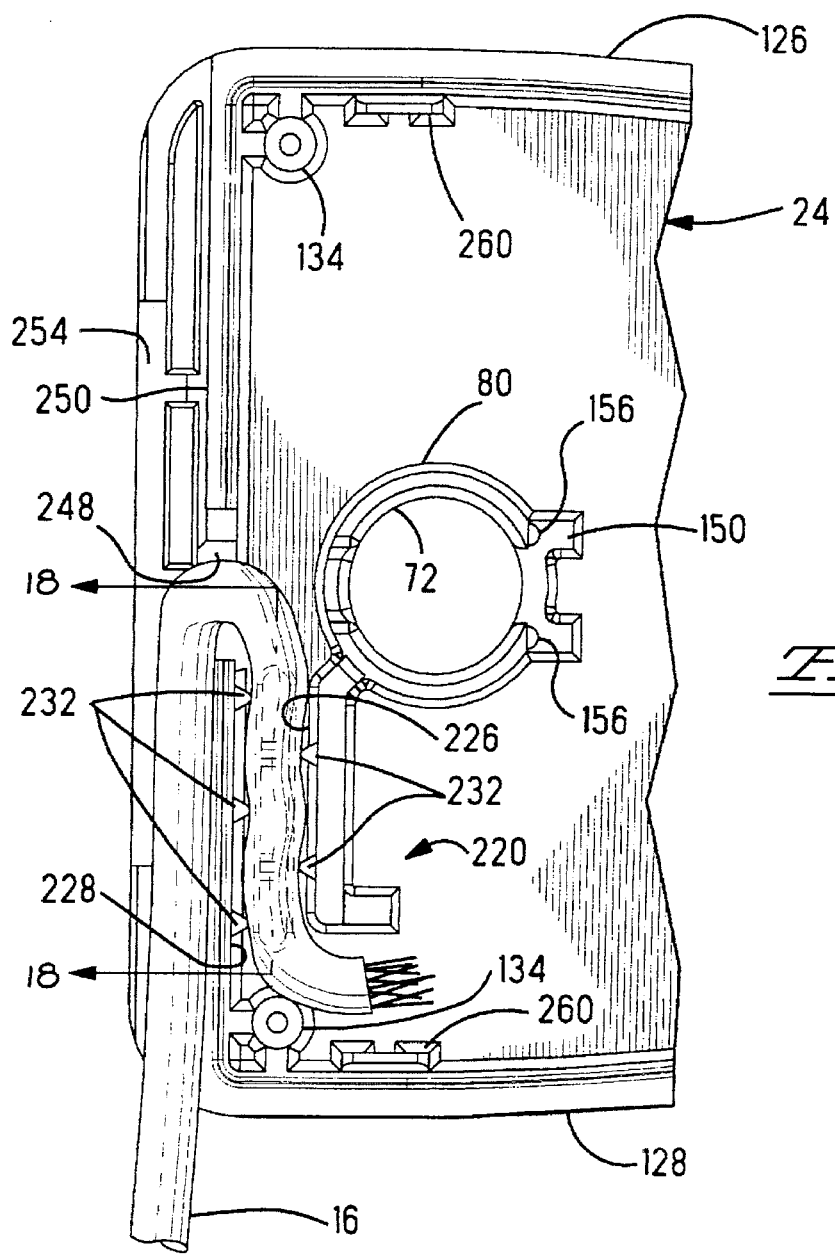
FIG. 17 is an enlarged view of that of FIG. 15 showing the cable in place with the strain relief.
Figure 18:
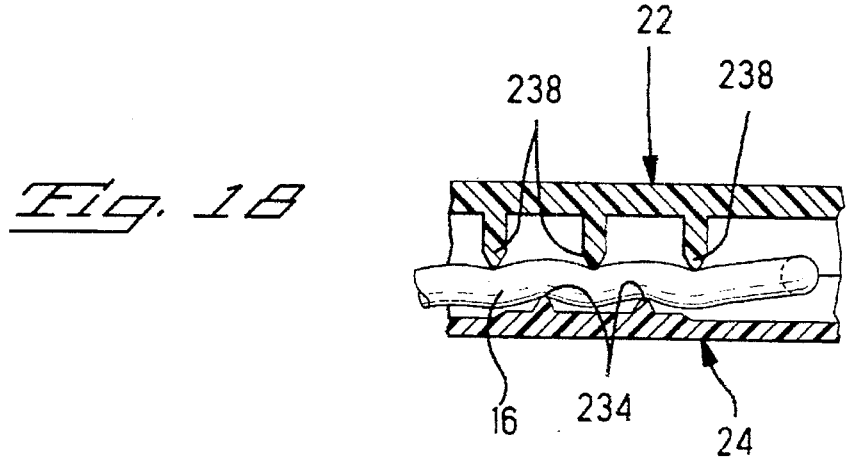
FIG. 18 is a cross-sectional view taken along the lines 18—18 in FIG. 16.

The housing assembly 12 includes a cable strain relief 220 that has a lower portion 222 that is formed in the lower housing half 24, as best seen in FIG. 15, and an upper portion 224 that is formed in the upper housing half 22, as best seen in FIG. 16. The two portions 222 and 224 cooperate to grip the cable 16 and prevent axial movement thereof with respect to the housing assembly 12. The lower portion 222 includes a pair of opposing walls 226 and 228 that form a cable receiving channel 230 therebetween. One of the walls 226 has two spaced apart ribs 232 extending into the channel and the other wall 228 has three spaced ribs 232 extending into the channel. The ribs are spaced so that each rib on the wall 226 is between two ribs on the opposite wall 228, that is, the ribs are staggered from one wall to the other. Further, the walls and ribs are spaced so that the cable 16 is interferingly received therebetween, as shown in FIG. 17. A pair of ribs 234 extend upwardly from the floor 92, or from a boss 236 on the floor, so that the ribs extend into the channel 230, in alignment with the two ribs 232 on the wall 226. The upper portion 224 of the strain relief 220 is composed of three ribs 238 extending from the ceiling 124 of the upper housing half 22, as best seen in FIG. 13. Each of the ribs 238 has a V-shaped notch 240 in the edge facing the rear wall 118 that engage a respective one of the three ribs 232 in the wall 228, when the two housing halves 22 and 24 are assembled together. The three ribs 238 extend into the channel sufficiently far to serve as abutting surfaces that engage the cable 16, forcing it to deviate from a straight line by bending slightly around the ribs 234 and 238, as best seen in FIG. 18. This results in the cable 16 being forced to follow a circuitous path in two planes, as shown in FIGS. 17 and 18, therefore, providing a superior strain relief for the cable.

Now with reference to FIGS. 8 to 10 and 15 to 17, a cable organizer 246 is formed in the rear walls 118 and 130 of the two housing halves and consists of a first opening or through hole 248 that extends into the interior cavity 30 and that intersects a laterally formed second opening, or shallow channel 250 that is formed partially in each rear surface 118 and 130 of the two housing halves 22 and 24, respectively. The opening 250 runs the entire length of the rear surfaces 118 and 130, and has a diameter that is equal to or slightly larger than the diameter of the cable 16 preferably defined by arcuate cable-engaging surface portions of the upper and lower housings. While the opening 250 is open toward the rear of the housing assembly 12, it has upper and lower outer lip portions 252 and 254, respectively (FIGS. 8 and 9), that extend over the opening slightly so that the distance between the two lips is slightly less that the diameter of the cable 16. This provides a snapping action when the cable is forced into the opening and serves to retain the cable in place. The cable 16, after exiting the interior cavity 30 via the through hole 248, may be routed either to the left or right portions of the opening 250, as desired. Further, the left or right orientation of the cable in the opening 250 may easily be changed by simply pulling it out of the opening and then reinserting it on the desired side. Due to the extra stress of the cable organizer 246 and cable strain relief 220 tending to urge the two housing halves 22 and 24 apart, an additional holding mechanism is provided, referring now to FIGS. 8, 9, 15 and 16. This is in the form of two resilient clips 260 that are formed integral to the lower housing half 24, each of which has a catch surface 262 that latchingly engages a pair of catches 264 that project from the side walls 114 and 116 of the upper housing half 22 and are formed integral thereto. The catches 264 have camming surfaces that permit the resilient clips 260 to deflect as the two housing halves are assembled together and then spring back into latching engagement, in the usual manner.

Three rubber pads 270, as best seen in FIGS. 3 and 4, are attached to the underside of the lower housing half 22 so that two of the pads are spaced near the rear wall 130 and one pad is centered near the front wall 132. These rubber pads allow the communications adapter to be used without the stand 14. The stand 14 is removed from the housing assembly 12 by simply pulling the ball portion 62 out of the cylindrical cavity 66. The housing assembly 12 may then be placed with its pads 270 on a support surface and aimed as desired. This is especially useful where the unit is to communicate with other equipment having an infrared communications adapter that is already in alignment with the support surface, such as a laptop computer that is on the support surface.

While the upper and lower housing halves 22 and 24 are secured together by means of several round posts in one of the parts being forced into hexagonal shaped holes in the other part, other shaped posts and mating holes may be utilized. For example, the posts may be square and the holes round, or they may be any other combination of different shapes. An important requirement is that the cross-sectional shape of the post be different from the cross-sectional shape of the hole and that they be sized to interfere.

An important advantage of the present invention is that the two housing halves 22 and 24, the light pipe 50, the circuit board 32, and the stand 14 and articulated coupling 60 are all assembled by simply snapping them together, without the need for loose fasteners or other loose parts, so that automated assembly processes are more easily employed. The infrared communications adapter 10 is easily aimed and held in place during use due to the articulated coupling 60. The stand is easily removed from the housing so that the communications adapter unit can be used without the stand if desired. Additionally, since the adapter is constructed of a minimum of separate parts that do not require external fasteners to join them together, the cost of manufacturing the device is substantially minimized over prior art adapters.

We claim:

1. A package for an infrared communications adapter including a circuit board having a communications circuit thereon including an infrared transceiver, said circuit arranged to interface with a data port by means of an electrical cable having a terminated connector, said package comprising: an upper housing half and a lower housing half, each of which includes first features that are integral to the respective housing halves and cooperate, and are the sole means, to position and interlock said housing halves together thereby forming a housing assembly having an interior cavity for holding said circuit board therein, said interior cavity having a longitudinal axis extending through said infrared transceiver near a first end of said cavity, wherein said first features include;

at least one projection extending from one of said upper and lower housing halves and at least one opening in the other of said upper and lower housing halves in alignment with said projection and arranged for interferingly receiving said projection therein thereby effecting said position and said interlock of said housing halves together, wherein said at least one projection and said at least one opening have respective cross-sectional shapes that are mutually different.

2. The package according to claim 1 wherein said at least one projection comprises four pins extending from said lower housing half and said at least one opening comprises four holes in said upper housing, each of said four holes being in alignment with a respective one of said four pins.

3. The package according to claim 2 wherein said first features include a latch formed on said lower housing half near a second end of said cavity opposite said first end, and a mating catch formed on said upper housing half so that when said two housing halves are assembled together said latch is in interlocking engagement with said catch.

4. The package according to claim 1 including second features within said interior cavity of said housing assembly that are the sole means to position and hold said circuit board therein, wherein said second features include:

(a) three spaced apart first surfaces that define a mounting plane for engagement with a major surface of said circuit board;

(b) two spaced apart second surfaces arranged to interferingly engage opposite sides of said circuit board and on opposite sides of said longitudinal axis when said circuit board is in said engagement with said first surfaces thereby confining movement of said circuit board laterally to said longitudinal axis;

(c) two spaced apart third surfaces arranged to interferingly engage opposite sides of said circuit board that are perpendicular to said longitudinal axis when said circuit board is in said engagement with said first surfaces thereby confining movement of said circuit board along said longitudinal axis.

5. The package according to claim 4 wherein said second features include a fourth surface arranged in opposing relationship to one of said three first surfaces so that said circuit board is disposed therebetween, wherein said first and second surfaces are on one of said upper and lower housing halves and said fourth surface is on the other of said upper and lower housing halves.

6. The package according to claim 1 including an opening through an end wall of said housing assembly adjacent said first end of said interior cavity, and an infrared lens in said opening, said infrared transceiver being adjacent said lens, said package including a stand for supporting said housing assembly on a flat surface by means of an articulated coupling arranged to permit movement of said housing assembly about horizontal and vertical axes for positioning said lens for receipt by said infrared transceiver of an infrared signal being transmitted from a remote device.

7. The package according to claim 6 wherein said articulated coupling comprises:

(a) a cylindrical opening in said lower housing half having an axis perpendicular to said longitudinal axis;

(b) a thermoplastic elastomer grommet having an outer diameter that is in said cylindrically opening and an inner diameter forming a cylindrically shaped cavity; and (c) a ball shaped member attached to said stand and extending into said cylindrically shaped cavity, wherein said ball shaped member has a diameter that is larger than said interior diameter of said grommet so that said cylindrical shaped cavity is conformably deformed by said ball, with a coefficient of friction therebetween sufficient to provide a static resistance to relative tilting movement of from about 0.01 inch pounds to about 0.03 inch pounds.

8. The package according to claim 7 wherein said grommet has a hardness of about 64 Durometers Shore A, and a modulus of elasticity at 100 percent elongation at about 360 pounds per square inch.

9. The package according to claim 8 wherein said cylindrically shaped cavity terminates in an hemispherical end wall that is engaged and deformed by a portion of said ball shaped member to provide said static resistance in cooperation with said interior cylindrical shaped cavity that is conformably deformed by said ball shaped member.

10. The package according to claim 9 wherein said cylindrical opening includes a key slot in said lower housing and said grommet includes a projection extending into said key slot to secure said grommet against rotation with respect to said lower housing.

11. The package according to claim 10 wherein said grommet includes an enlarged portion, larger than said outer diameter, having a shoulder in abutting engagement with said lower housing half.

12. The package according to claim 11 wherein said enlarged portion includes a hole formed therein axially to said cylindrically shaped cavity, said upper housing half having a projection extending therefrom into said hole.

13. The package according to claim 1 including an opening through an end wall of said housing assembly adjacent said first end of said interior cavity, and an infrared lens in said opening, said infrared transceiver being adjacent said lens, said lens having a portion that is substantially perpendicular to said longitudinal axis and another portion that is angled thereto so that said infrared transceiver can transmit and receive infrared light through both portions.

14. A package for an infrared communications adapter including a circuit board having communications circuitry thereon including an infrared transceiver, said circuit arranged to interface with a data port by means of an electrical cable, said package comprising:
   (a) an upper housing half and a lower housing half, each of which includes features that cooperate and are the sole means to position and interlock said housing halves together thereby forming a housing assembly having an interior cavity for holding said circuit board therein, said interior cavity having a longitudinal axis extending through said infrared transceiver near a first end of said cavity; and
   (b) a light pipe of unitary construction arranged adjacent said first end of said cavity and having at least two substantially discrete light conducting channels, each of which receives light from a respective light emitting diode on said circuit board, and conducts said light to an opening in one of said upper and lower housing halves which is observable from a position outside of said communications adapter.

15. The package according to claim 14 wherein said light pipe comprises:
   (a) a body having a mounting surface mounted to said upper housing half adjacent said circuit board;
   (b) at least two adjacent light conducting channels in said body separated by a gap therebetween; and
   (c) each said light conducting channel terminating in a viewing face in said opening in said upper housing half.

16. The package according to claim 15 wherein each said viewing face includes two frosted faces, one of which is parallel to said mounting surface and the other of which is angled thereto, said two frosted faces extending above said mounting surface and into said opening in said upper housing half.

17. The package according to claim 16 wherein said body of said light pipe includes a clear surface opposite said mounting surface arranged adjacent said light emitting diodes for receiving light therefrom into said light conducting channels.

18. A package for an infrared communications adapter including a circuit board having communications circuitry thereon arranged to interface with a data port, said package including an upper housing half and a lower housing half, each of which includes features that cooperate to position and interlock said housing halves together thereby forming a housing assembly having an interior cavity for holding said circuit board, said package including a cable organizer comprising:
   (a) a first opening through an end of said package, a portion of said opening being in each of said upper and lower housing halves and extending into said interior cavity, said opening arranged to receive a cable therethrough for interconnecting to said circuit board;
   (b) a second opening in said end of said package having a longitudinal axis that is substantially perpendicular to said first opening, intersecting said first opening, and extending on each side of said first opening, said second opening arranged to interferingly receive and hold a portion of said cable so that said cable extends out of said first opening and then is turned at right angles thereto and is held in said second opening on either side of said first opening.

19. The package according to claim 18 wherein said second opening is formed partly in a portion of said upper housing half and partly in a portion of said lower housing half, said two portions being mutually adjacent, and wherein each portion includes a lip that extends partly over said second opening so that said two lips are mutually opposed and are spaced apart a distance that is less than the diameter of said cable.

20. The package according to claim 19 wherein said second opening includes a concave wall extending substantially the entire length of said end.

21. The package according to claim 18 including a cable strain relief, a first portion of which is formed in said upper housing half and a second portion of which is formed in said lower housing half so that when said housing halves are assembled together with said cable in place, said first and second portions cooperate to grip said cable and prevent axial movement thereof with respect to said housing halves.

22. The package according to claim 21 wherein said second portion of said strain relief comprises a pair of opposing walls forming a cable receiving channel therebetween, one of said walls having two spaced apart ribs extending into said channel and the other of said walls having a rib extending into said channel between said two spaced apart ribs, said walls and ribs being spaced so that said cable is interferingly received therebetween.

23. The package according to claim 21 wherein said first portion of said strain relief comprises an abutting surface extending partially into said channel thereby holding said cable therein.

24. The package according to claim 23 wherein said cable receiving channel includes two spaced apart upwardly facing ribs and wherein said abutting surface engages said cable and urges it against said two upwardly facing ribs, said abutting surface being positioned centrally between said two upwardly facing ribs so that said cable is forced to deviate from a straight line by bending about said two upwardly facing ribs and said abutting surface.

25. A package for an infrared communications adapter including a circuit board having communications circuit thereon including an infrared transceiver, said circuit arranged to interface with a data port by means of electrical cable, said package comprising:
   an upper housing half and a lower housing half interlockable together thereby forming a housing assembly holding the circuit board in an interior cavity having a longitudinal axis extending through said infrared transceiver and an infrared transparent window at an end of said cavity, and
   said package includes a light pipe adjacent said end of said cavity and having at least two substantially discrete light conducting channels, each of which receives light from a respective light emitting diode on said circuit board, and conducts said light through facets in openings in the housing assembly which is observable from a position outside of said adapter.

26. A package as set forth in claim 25 wherein said light pipe comprises a body having a mounting surface mounted to said upper housing half adjacent said circuit board, at least two adjacent light conducting channels in said body separated by a gap therebetween, and each said light conducting channel terminates in a viewing facet in a respective said opening in said upper housing half.

27. A package as set forth in claim 25 wherein at least one of said upper and lower housing halves includes at least one projection extending toward the other of said halves and received into a respective opening therein in an interference fit securing said upper and lower housing halves together.

28. A package as set forth in claim 25 wherein one of said upper and lower housing halves defines a plurality of spaced-apart coplanar first surfaces supporting said circuit board in said interior cavity, at least two spaced-apart second surfaces abutting opposed side surfaces of said circuit board and at least two spaced-apart third surfaces abutting opposed end surfaces of said circuit board for positioning and holding said circuit board accurately in a selected position.

29. A package as set forth in claim 25 wherein said window comprises an opening through a front end wall of said housing assembly adjacent said first end of said interior cavity, and an infrared lens in said opening adjacent said infrared transceiver, said lens including a flange peripherally around at least portions of said lens seated within a groove defined by said opening.

30. A package as set forth in claim 25 wherein said package includes a cable organizer comprising:

(a) a first opening through a second end of said package and extending to a cable strain relief adjacent the interior cavity, and (b) a second opening at said second end of said package having a longitudinal axis that is substantially perpendicular to said first opening, intersecting said first opening, and extending on each side of said first opening, for holding a cable portion when said cable is directed to either side of said package.

31. A package for an infrared communications adapter including a circuit board having communications circuitry thereon including an infrared transceiver, said circuit arranged to interface with a data port by means of an electrical cable, said package comprising;

a housing assembly holding the circuit board in an interior cavity having a longitudinal axis extending through said infrared transceiver and an infrared transparent window at an end of said cavity; and a base member defining an articulated coupling with said housing assembly to permit horizontal and vertical positioning thereof, and said articulated coupling includes a cylindrical opening in a lower housing half having an axis perpendicular to said longitudinal axis, a grommet having an outer diameter that is in said cylindrical opening and an inner diameter forming a cylindrically shaped cavity, and a ball shaped member attached to said stand and extending into said cylindrically shaped cavity, said ball shaped member having a diameter that is at least as large as said interior diameter of said grommet and establishes sufficient friction in cooperation therewith to resist inadvertent movement of said housing assembly with respect to said base member.

32. The package according to claim 31 wherein said grommet is formed of thermoplastic elastomer, and wherein said ball shaped member has a diameter that is larger than said interior diameter of said grommet so that said cylindrically shaped cavity is conformably deformed by said ball, with a coefficient of friction therebetween sufficient to provide a static resistance to relative tilting movement of from about 0.01 inch pounds to about 0.03 inch pounds.

33. The package as set forth in claim 33 wherein said cylindrically shaped cavity terminates in a spherically shaped end wall that is engaged and deformed by a portion of said ball shaped member to provide said static resistance in cooperation with said interior cylindrically shaped cavity that is conformably deformed by said ball shaped member, said cylindrical opening includes a key slot in said lower housing half and said grommet includes a projection extending into said key slot to secure said grommet against rotation with respect to said lower housing half, and said grommet includes an enlarged portion larger than said outer diameter, having a shoulder in abutting engagement with said lower housing half.

* * * * *